Figure 1:
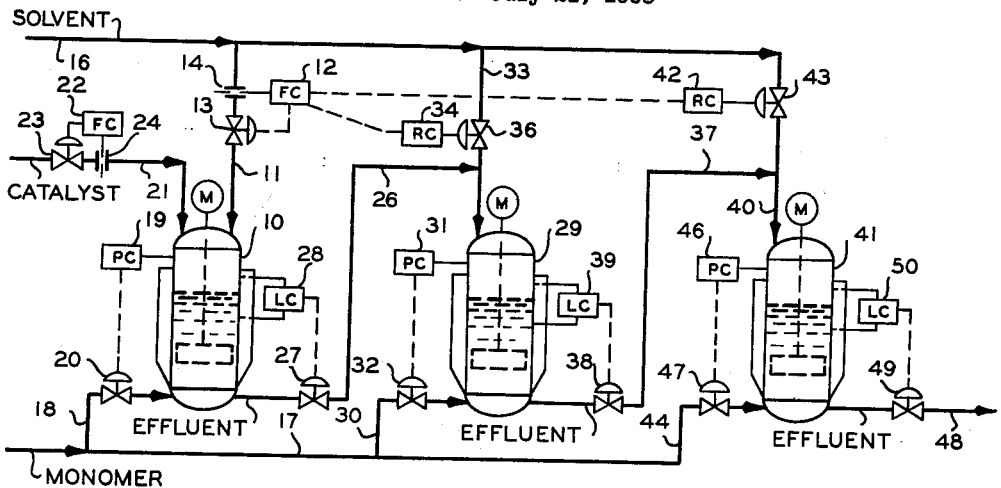

INVENTOR.
R.F. DYE
L.W. MORGAN

United States Patent Office 3,074,922
Patented Jan. 22, 1963

3,074,922
POLYMERIZATION PROCESS AND APPARATUS
Robert F. Dye and Lyman W. Morgan, Bartlesville, Okla., assignors to Phillips Petroleum Company, a corporation of Delaware
Filed July 21, 1958, Ser. No. 749,750
4 Claims. (Cl. 260—94.9)

This invention relates to an improved process for polymerizing monomeric material in a liquid phase catalytic reaction in which normally solid polymer is formed in solution. In other aspects this invention relates to apparatus and the control system for carrying out such a polymerization process. In still another aspect it relates to a method for controlling an exothermic polymerization reaction to achieve maximum production rates. In one of its more specific aspects the invention relates to a process for polymerizing mono-1-olefin to normally solid polymer in a liquid phase catalytic exothermic reaction with the reaction vessels arranged in series.

Olefinic materials, especially mono-1-olefins having from 2 to 8 carbon atoms per molecule and no chain branching nearer the double bond than the 4 position, can be polymerized to normally solid polymer in liquid phase catalytic reactions. Such a polymerization is disclosed and discussed in detail in the patent to J. P. Hogan et al. U.S. 2,825,721. This polymerization and others are highly exothermic and to maintain temperature control it is necessary to remove heats of reaction and of solution continuously from the reaction vessels. Frequently, the polymerization rates obtainable in such processes are limited by the capacity of the equipment to remove heat from the polymerization mixture. Normally solid polymer, especially polyolefin, forms viscous, thixotropic solutions at relatively low polymer concentrations. The heat transfer rate from the solution is governed to a considerable extent by the viscosity of the solution and it is, therefore, possible to remove more heat, and thereby obtain higher polymerization rates, from reaction mixtures which are relatively dilute in polymer content. Advantages obtained in this respect by polymerizing continuously in dilute mixtures are offset by the necessity to increase greatly the total bulk of material handled. For example, while a higher rate of heat removal can be obtained when polymerizing a mixture containing 4 percent polymer than can be realized for a mixture containing 8 perment polymer, the total amount of material handled is nearly doubled in the former case. This increases the possibility of solvent loss and requires more expensive recovery equipment.

According to our invention a polymerization process is provided which will yield an ultimate reactor effluent of any practical, desired polymer concentration while enabling advantages which accrue to polymerization in more dilute solutions to be enjoyed. We have found that catalytic exothermic liquid phase polymerizations can be efficiently carried out using reaction vessels arranged in series and maintaining the polymer concentration in each vessel at progressively increasing values in the direction of flow so that polymer concentration in the last vessel in the series is the desired ultimate polymer concentration. Maximum polymerization rates for any given set of reaction vessels can be obtained by feeding the catalyst to the first zone of the series and feeding fresh solvent to each reactor of the series. In achieving the superior results according to the best and preferred mode of our invention, polymer contrations in each zone or reactor have a fixed and unique relationship which is correlated to the heat removal capacity of each reactor and the desired final concentration. The polymerization system of our invention includes a plurality of reaction vessels arranged in series with each vessel being equipped with heat removal means and means for introducing catalyst to the first vessel in the series. Means are also provided for introducing fresh solvent and monomer to each vessel, for transferring effluent from the first and intermediate vessels to the respective subsequent vessel in the series and means for withdrawing effluent from the last vessel in the series. The preferred control apparatus in our system includes flow control means for the catalyst and monomer feeds with flow control means on the solvent feed to the first reactor and ratio flow control means on the solvent feeds to each subsequent reactor by which a constant ratio of solvent flow rates between the first reactor and each subsequent reactor can be maintained.

Figure 2:
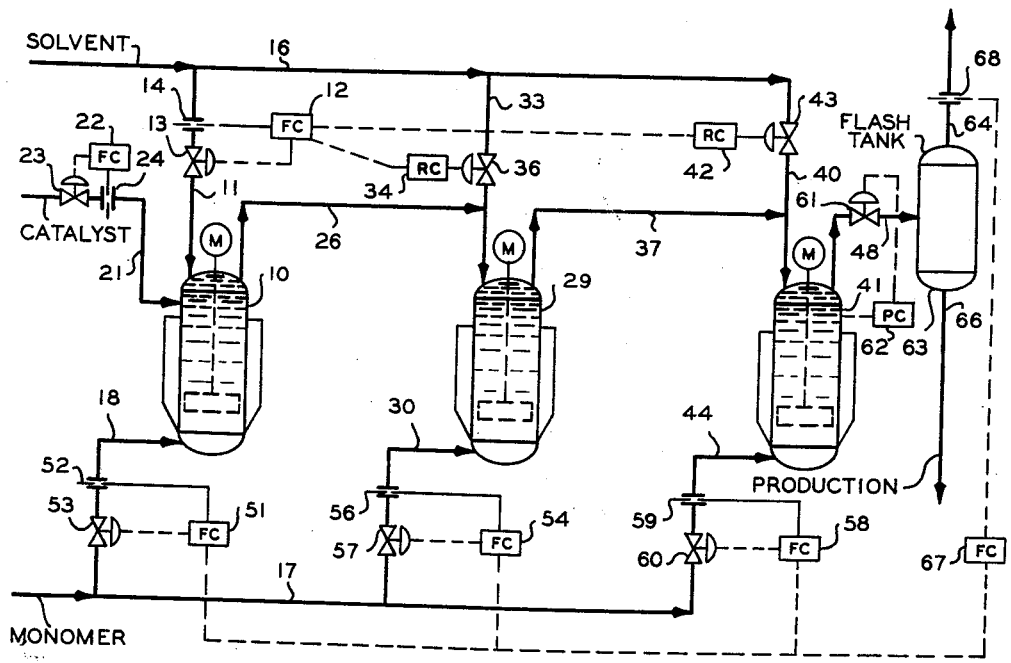

It is an object of our invention to provide an improved liquid phase polymerization process. Another object is to provide a reactor system and the controls therefor for carrying out a liquid phase catalytic polymerization reaction at maximum efficiency. Still another object is to provide a method for conducting exothermic polymerizations reactions in series and to obtain the highest rate of production which is possible from the available equipment with its heat removal capacity while arriving at a desirable ultimate high polymer concentration in the reaction effluent. Another object is to provide a process which enables the increased polymerization rates available at dilute polymer concentrations in the reaction mixture to be enjoyed while arriving at an ultimate higher polymer concentration in order to facilitate polymer recovery. Other objects, advantages and features of our invention will be apparent to those skilled in the art from the following discussion and drawing in which:

FIGURE 1 is a flow diagram depicting schematically one embodiment of our invention adapted for a series of gas-cap reactors, and FIGURE 2 is an alternate embodiment adapted for a series of substantially liquid-full reactors.

Solid polymers of mono-1-olefins can be readily obtained by polymerizing the monomers in a suitable solvent in the presence of a variety of catalyst systems, as disclosed in the above-mentioned patent to J. P. Hogan et al. Alpha-olefins including ethylene, propylene, 1-butene, 1-pentene, 1-hexene, 1-octene, 4-methyl-1-pentene, 4-methyl-1-hexene, and the like, can be polymerized in the liquid phase in the presence of a catalyst comprising as the sole essential ingredient chromium oxide associated with at least one porous oxide selected from the group consisting of silica, alumina, zirconia and thoria. Copolymers can also be formed. Our process is especially advantageous when polymerizing ethylene or propylene or mixtures of ethylene with propylene and/or 1- or 2-butene.

One adaptation of our invention is carried out in liquid phase employing as a solvent for the monomer and polymer a hydrocarbon, preferably a paraffinic or naphthenic hydrocarbon having from 3 to 12 carbon atoms per molecule. Examples of suitable solvents include propane, isopropane, normal pentane, isopentane, isooctane, cyclohexane, methylcyclohexane, and the like. The pressure is that sufficient to maintain the reaction mixture in the liquid phase and the temperature is generally controlled in the range of about 100 to 500° F., preferably from about 200 to 325° F. Since the reaction is exothermic it is necessary to provide a reaction vessel equipped with substantial heat removal capacity, generally in the form of internal coils and a jacket. Agitation is necessary to ensure complete and immediate mixing of the ingredients as they enter the reaction mixture and the work thus done on the reaction mixture is converted into heat which must also be removed. The heat of solution of the ethylene in the solvent must likewise be removed from the polymerization mixture. A highly desirable reactor design for such polymerization is disclosed in the copending application of R. F. Dye, Serial No. 580,770, filed April 26, 1956, now U.S. 2,875,027.

While our invention was developed for and has special utility in carrying out the above described polymerization processes, it can be used to advantage in the polymerization of any monomer which catalytically forms a normally solid polymer in solution so that the viscous nature of the polymerization mixture introduces problems of heat transfer. Likewise, while our process is especially advantageous in its application to exothermic reactions, by the same token a highly endothermic reaction could also be carried out according to our invention. The problem of heat transfer in such a case, however, is generally not as acute as in exothermic reactions.

The polymerization to which our invention is applied should be a catalytic reaction so that the addition of catalyst to the initial polymerization stage can be controlled and the catalyst concentration in subsequent stages varies by the introduction of fresh solvent. Other catalyst systems such as those derived from a compound of a group IV to VI metal and an organometal derivative, a metal hydride or a group I, II or III metal. With certain of these two component systems, an organic halide having 30 or less carbon atoms per molecule or a metal halide can be used as a third component. Examples of such systems include diethylaluminum chloride and titanium tetrachloride, ethylaluminum dichloride and titanium tetrachloride, titanium tetrachloride with aluminum and ethyl bromide, and the like.

To more fully describe our process, reference is now made to the drawing in which FIGURE 1 shows one suitable embodiment. In this figure, solvent is fed continuously to reactor 10 through line 11. The flow of solvent to reactor 10 is controlled by flow controller 12 operatively connected to motor valve 13 and orifice 14, both of which are in line 11. Solvent is fed to line 11 from header 16. Monomer from header 17 is fed through line 18 to reactor 10. The flow of monomer is controlled by pressure controller 19 which senses the pressure in reactor 10 and operates valve 20 in line 18 in response thereto. In this way the pressure in reactor 10 is held substantially constant. Catalyst is fed to reactor 10 through line 21. The flow of catalyst is maintained substantially constant by flow controller 22 operatively connected to motor valve 23 and orifice 24 both of which are in line 21. Solid particulate catalyst, such as the chromium oxide-containing catalyst above described, is suitably introduced in the form of a slurry of the catalyst suspended in solvent. A small portion of the total solvent fed to reactor 10 can be used in this manner. It is also possible to dissolve at least a portion of the monomer in the solvent before introducing it to the reactor so that the resulting heat of solution can be removed outside the reactor and thereby reduce the burden on the heat removal equipment of the reactor proper.

Reactor 10 is equipped with agitation means and jacket as well as cooling coils not shown. It is desirable to use a volatile coolant in the jacket and heat exchange coils so that heat absorbed by the coolant can be absorbed as heat of vaporization and thus reduce the necessary total flow of coolant. The polymer content of the reaction mixture in reactor 10 is held at a substantially constant preselected value which is determined in a manner to be explained later.

Reaction effluent from vessel 10 passes through line 26 controlled by motor valve 27 in response to liquid level in the reactor as sensed by liquid level controller 28. This effluent passes to reactor 29 which is held to a polymer concentration having a preselected value higher than that of reactor 10. Additional monomer is fed from header 17 through line 30 to reactor 29 in order to maintain the desired excess of monomer in the polymerization mixture. Monomer is introduced at a rate which will maintain a substantially constant pressure in vessel 29, this rate being controlled by pressure controller 31 which senses the pressure in vessel 29 and in response thereto operates motor valve 32 in line 30. Additional solvent is added to reactor 29 by introducing solvent into line 26 from line 33 connected to header 16. The flow in line 33 is controlled by ratio controller 34 which is operatively connected to motor valve 36 and flow controller 12. The flow in line 33 is thus maintained at a fixed and constant ratio to the flow of solvent through line 11. This ratio is determined by the polymer concentrations maintained in reactors 10 and 29 and the heat removal capacities of these reactors as will be more fully explained later.

Effluent from reactor 29 like that from reactor 10 is controlled in response to liquid level in the reactor. The effluent passes through line 37 carrying motor valve 38 connected to liquid level controller 39. Effluent in line 37 is mixed with additional solvent from line 40 and passes to reactor 41. The flow of solvent through line 40 is controlled by ratio controller 42 connected to motor valve 43 and flow controller 12. The flow of solvent through line 40, therefore, is held at a constant ratio to the flow through line 11. Additional monomer is introduced to reactor 41 through line 44 to maintain the pressure in reactor 41 substantially constant and introduce sufficient additional monomer to continue the polymerization. Pressure controller 46 connected to the top of vessel 41 and motor valve 47 controls the rate of monomer feed thereto. The polymer concentration in vessel 41 is held at the desired final concentration which can be any practical value. Generally, for the polymerization of olefins to normally solid polymers, the final concentration is in the range of about 6 to 10 weight percent. At higher concentrations the mixture becomes too viscous for satisfactory control in the final polymerization stage and at lower concentrations the additional bulk of polymerization mixture is undesirably large. Effluent from reactor 41 is removed through line 48, controlled by valve 49 and liquid level controller 50.

Referring to FIGURE 2, an alternate embodiment is shown in which the reactors are operated substantially liquid full with little or no distinct vapor space in the upper portion of the reactor. In FIGURE 2, all features in common with FIGURE 1 are referred to by the same reference numeral. The principal difference is in the introduction of monomer, which instead of being controlled in response to reactor pressure is maintained at substantially constant flow to each reactor. Monomer flow to reactor 10 is maintained substantially constant by flow controller 51 connected to orifice 52 and motor valve 53 in line 18. Monomer to reactor 29 is held at a substantially constant flow by flow controller 54 operatively connected to orifice 56 and motor valve 57 in line 30. The monomer feed to reactor 41 is held substantially constant by flow controller 58 connected to orifice 59 and valve 60 in line 44.

The effluent from reactor 41 passes through line 48 at a rate controlled by valve 61 in response to pressure in reactor 41 as sensed by pressure controller 62. In this manner the pressure in the series of reactors is held at the desired value. Effluent in line 48 passes to flash tank 63 in which the pressure is reduced sufficiently to flash unreacted monomer from the effluent. The monomer passes overhead through line 64 while the effluent leaves the bottom of flash tank 63 through line 66, passing to polymer recovery steps, not shown. An additional control feature is provided in this embodiment by flow controller 67 connected to an orifice 68 in line 64. Flow controller 67 thus senses an increase or decrease in the flow of unreacted monomer and resets flow controllers 51, 54 and 58 accordingly. Full correction on reset of controller 58 is delayed for the residence time of reactors 10 and 29, and full correction on reset of controller 54 is delayed for the residence time of reactor 10, so that the effect of corrections made in controllers 51 and 54 can be observed before full correction is made in controllers 54 and 58.

The polymer concentrations which are maintained in reactors 10 and 29 must be established after the desired final concentration in reactor 41 is known. We have found that in order to obtain maximum production rates in reactors 10 and 29 which have a maximum heat removal capacity for any polymer concentration it is necessary to arrive at and maintain unique polymer concentrations in these reactors. These concentrations are obtained by controlling the solvent flows to each reactor at specific rates which will produce these concentrations with the maximum production of polymer obtained in each reactor. The concentration of polymer is most dilute in the first reactor and most concentrated in the last reactor with concentrations in intermediate reactors increasing in the direction of flow.

To practice our invention, at least two reactors in series must be employed and the preferred number is three reactors as shown in the drawing. This preference is primarily for reasons of control so that the over-all reaction does not become too complicated and our invention can be practiced with any reasonable number of reactors. Also, in accordance with our invention, all reactors are substantially duplicates, or at least very similar in design.

The polymerization rate in the first reactor will be the highest so that maximum use can be made of the lower polymer concentration and hence higher heat removal capacity. For this reason it is desirable to add all of the catalyst to the first reactor in the series so that the catalyst concentration in this reactor is at the highest value in the process. Most of the monomer is added to reactor 10 in sufficient excess to obtain the desired polymerization rate at the degree of conversion obtainable with the catalyst and polymerization conditions in use. As additional solvent is added at each downstream reactor the concentration of catalyst is decreased and the polymerization rate is likewise decreased. This is, of course, desirable since at these higher polymer concentrations the heat removal capacity is decreased and, therefore, less heat of reaction can be withdrawn.

To arrive at the unique preselected values of polymer concentration, the amounts of solvent are controlled so that the ratio of the pounds of solvent per hour fed to the first reactor in the series to the total amount of solvent including fresh solvent and effluent solvent fed to the second reactor in the series is approximately equal to the ratio of the polymerization rate in the second reactor to the polymerization rate in the first reactor. By the same token the ratio of total solvent to the second reactor to the total solvent to the third reactor should be approximately equal to the ratio of the polymerization rate in the third reactor to the polymerization rate in the second reactor. The polymerization rate in each reactor is the maximum obtainable with the available heat removal capacity at the polymer concentration in that reactor. Employing this relationship throughout the series of reactors the unique values for polymer concentration can be obtained and the maximum possible production of polymer for any given set of reactors can be realized. As an example of the improvement which our process provides over comparable reactors arranged in parallel, the following specific embodiment is presented.

Ethylene is polymerized to polyethylene having a density of about 0.955 gram per cubic centimeter, 25° C. and a melt index of about 0.9 as determined by ASTM Method No. D1238-52T using five 2-minute extrudate samples. Three reactors equipped with stirrers, heat exchange coils and jackets are arranged in series so that the reaction effluent from the first reactor flows to the second and from the second to the third. The polymer concentration of the final effluent is 7.0 weight percent. Reaction conditions and the flow of materials with polymer concentrations and pounds of polymer produced per hour are shown in Table I. The solvent employed is cyclohexane and the catalyst is a catalyst containing 2.1 percent chromium oxide as hexavalent chromium supported on silica-alumina. As shown in Table I, using three reactors in series at the specified polymer concentrations, total polymer produced is 2,225 pounds per hour. This polymer is produced at the maximum rate possible with the reactors described having their specified heat removal capacity. With the reactors in parallel, all would operate at the desired final concentration of 7.0 percent and all would produce polymer at a rate of 603 pounds per hour for a total production of 1809 pounds of polymer per hour.

*Table I*

| FIG. 2 Ref. No. | Pounds per hour | | |
|---|---|---|---|
| | Reactor 10 | Reactor 29 | Reactor 41 |
| Fresh feed: | | | |
| Solvent | 19,100 | 5,900 | 4,600 |
| Catalyst | 8.9 | | |
| Ethylene | 1,383 | 589 | 555 |
| Polymer conc. | ¹4.6 | ¹6.1 | ¹7.0 |
| Effluent: | | | |
| Solvent | 19,100 | 25,000 | 29,600 |
| Catalyst | 8.9 | 8.9 | 8.9 |
| Ethylene | 461 | 350 | 302 |
| Polymer | 922 | 1,622 | 2,225 |
| Polymer produced | 922 | 700 | 603 |
| Reactor pressure | 420 pounds per square inch gage. | | |
| Reactor temperature | 285° F. | | |
| Coil area | 576 square feet. | | |
| Jacket area | 286 square feet. | | |
| Coolant temperature | 235° F. | | |
| Power input (agitation) | 35 horsepower. | | |
| Conversion in each reactor | 66.7 percent. | | |

¹ Percent.

Polymer concentrations for reactors 10 and 29 are unique for the particular reactors, conditions and final concentration assumed.

From the teaching of this specification these concentrations can be determined by anyone skilled in the art for any set of reactors on which the heat removal capacities at specified polymer concentrations of the reaction mixture are known.

As an illustration, sample calculations for the above example are given below:

Heat removal capacities of each reactor carrying polymerization mixtures having specific polymer concentrations are as follows:

[Heat input from agitation equals 89,000 B.t.u. per hour]

| Polymer concentration (weight percent) | Heat removal capacity (B.t.u. per hour) | Maximum production (pounds polymer per hour) |
|---|---|---|
| 3.0 | 2,043,000 | 1,175 |
| 4.0 | 1,741,000 | 1,020 |
| 5.0 | 1,462,000 | 857 |
| 6.0 | 1,217,000 | 710 |
| 7.0 | 1,039,000 | 603 |

From a curve established from the above data maximum production for the concentration of 4.6% equals 922 pounds per hour and for 6.1% equals 700 pounds per hour. These values are unique for three such reactors in series where the final concentration of polymer is 7.0%, as shown by the necessary ratios of production and solvent flow. For example:

Production rate of reactor 41÷production rate of reactor 29 should equal approximately
Solvent effluent of reactor 29÷solvent effluent of reactor 41

$$603/700 = 0.861 \quad 25,000/29,600 = 0.845$$

Production rate of reactor 29÷production rate of reactor 10 should equal approximately Solvent effluent of reactor 10 ÷ solvent effluent of reactor 29

700/922 = 0.759   19,100/25,000 = 0.764

It is to be understood, as shown by the above example, that the ratios of production rates and solvent effluent need not be exactly equal in order for the major benefits of our invention to be enjoyed. Exact equality can be obtained by trial and error calculations or by solving the problem on a digital computer. The method of arriving at the unique polymer concentration in each reactor will be readily apparent to those skilled in the art and our invention does not reside in the mathematical approach to the problem. Our invention embodies, rather, the recognition that maximum production rates for any given set of reactors, polymerization, and desired final polymer concentration can be obtained by operating the reactors in series at unique polymer concentrations and the method of achieving this result with series operation, feeding catalyst to the first reactor in the series and fresh solvent to each reactor at specific rates. The amount of fresh solvent added increases the total bulk of the reaction mixture, but is not large enough to prevent polymer concentration from increasing from reactor to reactor in the series.

As will be evident to those skilled in the art, various modifications of this invention can be made, or followed, in the light of the foregoing disclosure and discussion, without departing from the spirit or scope thereof. Although the above example shows all reactors in series to be operating at the same temperature, it is at times advantageous to operate the reactors at different temperatures, preferably increasing in the direction of flow, and thereby obtain a blend of polymer properties which can be varied to meet specific requirements.

We claim:
1. In a process for polymerizing 1-olefins to normally solid polymer in a continuous, liquid phase, catalytic, exothermic reaction wherein the polymer is formed in solution in a liquid solvent and the polymerization is carried out in a plurality of reaction zones of substantially equal volume and having substantially equal capabilities for contacting reactants and removing heat by an indirect heat exchange system for a given concentration of polymer in solution, the improved method of operating said reaction zones in series which comprises:
   (1) feeding fresh solvent to each zone at substantially different and successively decreasing rates;
   (2) feeding monomer to each zone to maintain desired monomer concentrations;
   (3) feeding fresh catalyst to the first zone of the series only at a substantially constant rate;
   (4) feeding the effluent from each reaction zone to the next zone in the series with the effluent from the last zone passing to product recovery steps;
   (5) removing heat from each zone by indirect heat exchange at substantially constant rates, the rate of heat removed from each zone being about the maximum possible with said heat exchange system for the polymer concentration in the solution in the zone;
   (6) and controlling the rate of fresh solvent feed to each zone in such a manner that
      (a) the polymer concentration in the solution in the last zone is the highest concentration and the polymer concentrations in the preceding zones are substantially and progressively smaller with the lowest concentration being in the first zone of the series,
      (b) the polymer production rate is the highest in the first zone and substantially and progressively smaller in each subsequent zone with the lowest production rate being in the last zone of the series,
      (c) and the ratio of the total solvent feed rate to each zone including fresh solvent and solvent introduced in the effluent from a preceding zone to the total solvent feed rate to a subsequent zone is approximately equal to the inverse of the ratio of the polymer production rates of the respective zones.

2. A process according to claim 1 wherein the catalyst, ethylene and first zone solvent feed rates are controlled at constant flow rates, the solvent feed rates to the second and subsequent zones are controlled at constant ratios to the flow of solvent to said first zone, and the effluent flow from the last zone is controlled in response to pressure in said last zone.

3. A process according to claim 1 wherein the catalyst and solvent rates to the first zone are controlled at constant flow rates, the ethylene feed rate to each zone is controlled in response to pressure in the respective zone, the solvent feed rates to the second and subsequent zones are controlled at constant ratios to the flow of solvent to said first zone, and the effluent from each zone is controlled in response to liquid level in the respective zone.

4. A process according to claim 2 wherein the effluent from said last zone is flashed to remove unreacted ethylene, the flow of said unreacted ethylene is measured and the feed rates of ethylene to said zones are adjusted in response to said flow of unreacted ethylene.

References Cited in the file of this patent
UNITED STATES PATENTS

| | | |
|---|---|---|
| 2,440,822 | Hachmuth | May 4, 1948 |
| 2,518,307 | Groebe | Aug. 8, 1950 |
| 2,726,231 | Field et al. | Dec. 6, 1955 |
| 2,837,587 | Hogan et al. | June 3, 1958 |
| 2,860,126 | Cines | Nov. 11, 1958 |
| 2,886,561 | Reynolds et al. | May 12, 1959 |
| 2,889,314 | Fritz | June 2, 1959 |
| 2,908,738 | Cottle | Oct. 13, 1959 |
| 2,978,441 | Sherk | Apr. 4, 1961 |